United States Patent
Penn

(10) Patent No.: US 6,676,387 B1
(45) Date of Patent: Jan. 13, 2004

(54) METERING PUMP WITH A ROTARY VALVE RESPONSIVE TO ELECTRICAL SIGNALS FROM THE CONTACT BETWEEN A FLUID RESPONSIVE SHUTTLE AND DUAL PROBES

(76) Inventor: Laurence Richard Penn, 14 Main Street, Middleton, Market Harborough (GB), LE16 8YU ( * ) Notice: Subject to any disclaimer, the term of this patent is extended or adjusted under 35 U.S.C. 154(b) by 49 days.

(21) Appl. No.: 10/018,334

(22) PCT Filed: Jun. 7, 2000

(86) PCT No.: PCT/GB00/02205
§ 371 (c)(1),
(2), (4) Date: Apr. 16, 2002

(87) PCT Pub. No.: WO00/75611
PCT Pub. Date: Dec. 14, 2000

(30) Foreign Application Priority Data

Jun. 7, 1999 (GB) ............................................. 9913194
Jun. 7, 1999 (GB) ............................................. 9913197

(51) Int. Cl.[7] .................................................. F04B 35/02
(52) U.S. Cl. .................. 417/403; 417/502; 417/505; 417/503; 417/400; 417/401; 222/253; 222/129.1; 222/136; 222/250
(58) Field of Search ................................. 417/502, 505, 417/507, 503, 403, 225, 399, 400, 401, 404; 222/253, 129.1, 136, 249, 250, 344, 345, 350, 361, 367

(56) References Cited

U.S. PATENT DOCUMENTS 3,292,824 A * 12/1966 Arp et al. .................... 222/250
4,349,130 A * 9/1982 Bair ........................ 222/129.2
4,661,049 A * 4/1987 Tanner ........................ 417/418
4,779,761 A * 10/1988 Rudick et al. .................. 222/1
4,821,515 A   4/1989 Stein
5,121,855 A * 6/1992 Credle, Jr. ............... 222/129.2
5,381,926 A * 1/1995 Credle et al. ................... 222/1
5,423,661 A * 6/1995 Gabeler et al. .......... 417/410.4
5,556,001 A * 9/1996 Weissman et al. ............. 222/1
6,164,930 A * 12/2000 Tremoulet, Jr. ............. 417/401
6,179,583 B1 * 1/2001 Weston ....................... 417/392

FOREIGN PATENT DOCUMENTS

EP         0 545 560        6/1993
WO          90/10198        9/1990
WO       WO90/10198    *   9/1990

* cited by examiner

Primary Examiner—Cheryl J. Tyler
Assistant Examiner—Emmanuel Sayor

(57) ABSTRACT

A metering device contains a rotor which defines elongate chamber, there being a shuttle contained within the chamber movable between two terminal end positions. Frusto-conical surfaces defined on the rotor cooperate with annular members defining corresponding seats. One passage extends from one end of the chamber to one frusto-conical surface, and another passage extends from the other end of the chamber to the other frusto-conical surface. Each annual element defines a respective inlet and outlet for fluid and a shuttle is present within the chamber. As the rotor rotates, the shuttle effects a shuttling movement thus measuring dispensed volumes of fluid. A sensor is provided to detect physical contact of the shuttle with the end of the chamber to cause the rotor to advance.

19 Claims, 10 Drawing Sheets

METERING PUMP WITH A ROTARY VALVE RESPONSIVE TO ELECTRICAL SIGNALS FROM THE CONTACT BETWEEN A FLUID RESPONSIVE SHUTTLE AND DUAL PROBES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

1. Field of the Invention

The present invention relates to a metering device.

2. Background of the Invention

Metering devices have been proposed before. One type of metering device is used to control the dispensing of a liquid or fluid, which may be supplied to the metering device under pressure, and the metering device acts to dispense a precisely predetermined quantity of the liquid or fluid. An alternative form of metering device monitors the flow rate of liquid or fluid passing through the device.

The present invention seeks to provide a metering device which may be used for either of the purposes outlined above.

It is to be noted that it has been proposed previously to use metering devices to control the relative metering of two or more reactive liquids which together form a two-component reactive system in ratio to each other prior to their being mixed and dispensed. Examples of such two-component reactive systems are epoxies, polyurethanes, acrylics, silicones and polysulphides with their typical functions as sealing, bonding, encapsulating, coating, mould making, moulding and electrical or thermal insulating. Needless to say, such materials are currently used in nearly every type of production circumstance and across a very broad range of industries.

Despite their current importance and level of application, it should be appreciated that the use of multi-component reactive liquid systems, despite all the advantages, is still the subject of considerable scepticism by designers and production engineers. This is for the simple reason that "state of the art" shot or flow metering, mixing and dispensing machinery does not assure that the correct relative proportioning of the two or more chemical components takes place within a tolerance, or even that it takes place at all. Mixed resin color changes, such as yellow and blue mixing to become green, can sometimes be used for visually checking that a degree of correct proportioning has taken place, but many premixed components are of approximately the same color and therefore no change is identifiable visually. Also, mixed product testing can be done on a random basis but if it is, it is not a check on the total product. Therefore, with the fact that "state of the art" machines can, and do, partially fail, fluctuate in failure, progressively fail through wear or totally fail, this is an area where the end mixed product specification is unqualified and where part or total failure of the end product remains a hazard. The scepticism of production engineers concerning this type of process is understandable, especially since quality assurance standards demand total control. Only sectors of the aircraft industry can presently justify a costly one hundred percent quality assurance system whereby part of a product batch is applied to a structure with its position in a structure being recorded while the other part of the batch is laboratory tested, rejected or approved, documented and stored.

While two or more component reactive systems have been mentioned, there are other areas of great significance where metering takes place such as with multiple chemical stream processes or in a single component metered shot application as, for instance, with grease being placed within a bearing. In all applications, the need remains to assure performance but in some applications the need is to ensure the avoidance of a catastrophe through product failure in the field.

EP 0,646,776A discloses a metering device for fluids which is specifically intended for use in a proportioning and mixing apparatus for a two-component material. The device is an oscillatory device.

In the arrangement disclosed in EP 0,646,776A, a housing is provided having a fluid inlet and a fluid outlet. A passage, within the housing, forms a communication between the fluid inlet and the fluid outlet. A rotary member is provided located within the passage which effectively seals the passage, the rotary member defining a diametrically extending bore which, in two rotational positions of the rotary member, becomes aligned with the passage. A ball is contained within the bore, and is adapted to form a sealing engagement with each of two seats provided for that purpose, at opposed ends of the bore.

In use of the metering device, shown in EP 0,646,776A, after the apparatus has been primed, so that the flow passage Within the housing and the bore within the rotary member are both full of liquid to be dispensed, when the rotary member is moved to a first position, with the ball engaging the seat located closest to the fluid inlet, fluid will flow through the fluid inlet and into the bore, pushing the ball away from the seat so that the ball moves axially of the bore until the ball engages the other seat. Fluid that was initially contained with the bore is thus expelled into the part of the passage adjacent the fluid outlet so that fluid is forced out of the metering device. When the ball engages the seat which is located adjacent the fluid outlet, no further fluid can flow through the device.

The rotatable element is then rotated through 180° so that the ball is again located at a position adjacent the fluid inlet. The cycle of operation then repeats. The rotatable element is rotated at such a rate that it is anticipated that the ball completes the journey from one seat to the other seat on every occasion that the rotatable element is in a position such that the bore is aligned with the passageway.

It is often difficult to maintain appropriate seals in the arrangement disclosed in EP 0,646,776A, bearing in mind that the ball is subjected permanently to the source of the fluid under pressure.

BRIEF SUMMARY OF THE INVENTION

The present invention seeks to provide an improved metering device.

According to this invention there is provided a metering device, the metering device comprising means defining a chamber having two opposed ends comprising an elongate bore, each end of the elongate bore accommodating a respective probe, the inner ends of which bound the chamber, at least one probe being axially adjustable in position, each probe having electrically conductive means extending from the inner end face of the probe, there being inlet means to enable fluid to enter one end of the chamber and inlet means to enable fluid to enter the other end of the chamber, there being outlet means to enable fluid to exit from said one end of the chamber, and outlet means to enable fluid to exit from the other end of the chamber, there being a shuttle provided within the chamber at a position intermediate said two ends, at least the opposed ends of the shuttle being electrically conductive, the shuttle acting sealingly to separate the two ends of the chamber, the shuttle being movable between two terminal positions, each probe being responsive to physical contact with the shuttle to generate a respective electrical signal when the shuttle reaches each one of said two terminal positions, there being valve means to control fluid flow which, in one condition, permit the entry of fluid into one end of the chamber and permit the simultaneous exit of fluid from the other end of the chamber and which, in another condition, permit the entry of the fluid into said other end of the chamber and permit simultaneous exit of fluid from the said one end of the chamber, there being control means adapted to change the condition of the valve means on receipt of a said electric signal generated when the shuttle reaches a said terminal position.

Advantageously the inlet and outlet means incorporate ports in the side-wall of the chamber and the inner-most end of each probe which defines the chamber is configured to permit the entry or exit of fluid if the inner-most end of the probe is aligned with a said port.

Conveniently the inner-most ends of the probes which defines the chamber are of reduced diameter.

Preferably the shuttle has a central part which is a sealing sliding fit within the chamber, and two terminal end parts of reduced diameter.

Preferably the valve means is constituted by a rotor assembly, the rotor assembly being such that in one position thereof a fluid flow is established between a first inlet, and one end of the chamber, and is also established between the other end of the chamber and a first outlet, whereas in a second position of the rotor assembly fluid flow is established between a second inlet and the other end of the chamber, and between said one end of the chamber mid a second outlet, the rotor assembly being movable, by motor means, between said positions in response to a signal generated when the shuttle reaches one of said terminal positions.

Advantageously, the device comprises a housing provided with first inlet means and second inlet means, and also provided with first outlet means and second outlet means, the rotor assembly being rotatable within the housing, the motor assembly having an element defining the said chamber, and also defining a first passage which extends from one end of the chamber and a second passage which extends from the other end of the chamber, the rotor assembly, in one position, having the first passage aligned with and in communication with said first inlet and said second passage aligned with and in communication with said first outlet, and being rotatable to a second position in which said first passage is aligned with and in communication with said second outlet and said second passage is in alignment with and in communication with said second inlet the said passages being substantially sealed in other positions of the rotor.

Conveniently the rotor has a first plurality of passages located to be aligned individually, on rotation of the rotor, with the first inlet and second outlet, and a second plurality of passages located to be aligned individually, on rotation of the rotor, with the second inlet and first outlet.

Preferably said first plurality of passages and said second plurality of passages each comprise an odd number of passages, between five and nine.

Conveniently the rotor assembly has a body portion, the body having a central region with a relatively large diameter, the body tapering, from the central region of large diameter, towards opposed ends of the body, each tapering part of the body being snugly received within a co-operating frusto-conical or tapering opening formed in a respective annular element, each annular element being provided with a respective said inlet and a respective said outlet.

Preferably said annular elements are retained within a housing, and means are provided to apply force to the annular elements to bias the elements inwardly into secure sealing contact with the tapering parts of the body.

Conveniently the force applying means comprise means to apply hydraulic pressure to the end faces of the annular elements.

In an, alternative preferred embodiment of the invention the metering device comprises a fixed body, the fixed body defining said chamber and defining first inlet means, second inlet means, first outlet means and second outlet means, each of said inlet means and outlet means terminating at an exterior surface of the body at a position adjacent the termination, at the exterior of the body, of a respective passage leading to a respective end of the said chamber, the rotor assembly being mounted on the exterior of the body, the rotor assembly having means which, in one position of the rotor assembly, create a communication between the first inlet and the respective passage, and the second outlet and the respective passage and which, in an alternate position of the rotor assembly establish a connection between the second inlet and the respective passage, and the first outlet and the respective passage but which, in other positions of the rotor assembly, substantially seal said inlets and said passages.

In a further embodiment the valve mean comprise individual valves associated with said inlet means and outlet means.

In one arrangement one end of the chamber is connected to a valve, the valve being adapted to connect said one end of the chamber selectively to either a source of fluid to be introduced to the chamber, or to an exit conduit, the other end of the chamber being connected to a second corresponding valve adapted to connect the said other end of the chamber selectively to either an exit conduit, or a source of fluid to be introduced to the chamber.

In another arrangement each end of the chamber is associated with a respective entry conduit and exit conduit, each conduit having a respective valve to control flow in the conduit.

Preferably a sensor is provided to sense fluid leaking from the device and to generate a signal indicative of the fluid leakage detected.

Conveniently the device further incorporates stop valve means in a flow path for fluid leaving the chamber, the stop valve means being adapted to be opened only when the valve means permit flow from the chamber to the flow path.

The invention also relates to a metering device arrangement which incorporates two metering devices as described above, each metering device being associated with a reservoir of liquid to be metered by the metering device, the outlets of the metering devices being directed to a mixer adapted to mix liquids from the reservoirs when metered by the devices, the control means of the metering devices each providing signals to a supervising control arrangement, the supervising control arrangement being adapted to stop the operation of one metering device in response to a ceasing of the operation of the other metering device.

Preferably the control means of each metering device pass a signal to the supervising control means on receipt of a signal generated when a shuttle of the respective metering device reaches a respective terminal position, the supervising control means incorporating counters adapted to count the signals, and means to compare the counts present in the counter, the supervising control further including means adapted to stop operation of the metering devices if an output from the comparator exceeds a predetermined threshold.

Advantageously means are provided to re-set the counters when the count in a counter exceeds a predetermined threshold.

BRIEF DESCRIPTION OF THE SEVERAL VIEWS OF THE DRAWINGS

In order that the invention may be more readily understood and so that further features thereof may be appreciated, the invention will now be described, by way of example, with reference to the accompanying drawings.

DETAILED DESCRIPTION OF THE INVENTION

Figure 1:
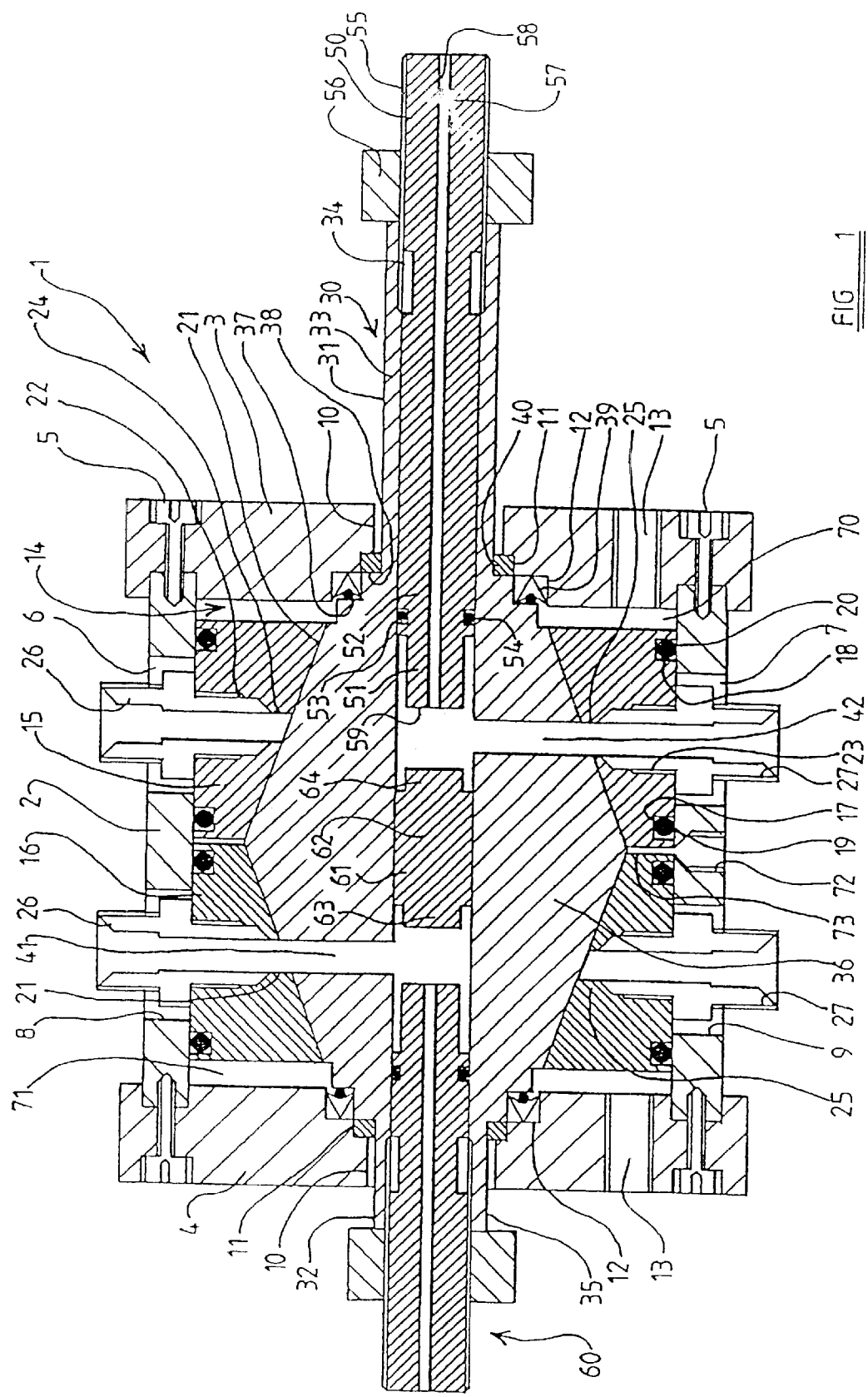
FIG. 1 is a cross-sectional view of the main part of a metering device in accordance with the invention.

Referring initially to FIG. 1 of the accompanying drawings, the main part of a metering valve comprises a housing 1 constituted by a short tube 2 provided with two end plates 3, 4, each end plate being secured to a respective end of the tube 2 by a plurality of screws 5.

The tube 2 is provided with a plurality of apertures formed in the side wall thereof, there being two diametrically opposed apertures 6, 7 located adjacent the end plate 3, and two further diametrically opposed apertures 8, 9 located adjacent the end plate 4. In the embodiment illustrated, the apertures 6 and 8 are axially aligned, and the apertures 7 and 9 are axially aligned.

The end plate 3 is provided with a centrally located aperture 10, the aperture 10 communicating with a seat 11 directed towards the side of the end plate 3 facing towards the interior of the tube 2. The seat 11 is of circular form, having a diameter slightly greater than the diameter of the aperture 10. The seat 11 itself communicates with a further seat 12 which is formed within the face of the end plate 3 directed towards the interior of the tube 2, the seat 12 again being of circular form and having a diameter greater than that of the seat 11.

The end plate 3 is additionally provided with a screw-threaded through passage 13 located between the aperture 10 and the periphery of the end plate 3.

The end plate 4 has a construction which is a mirror image of the plate 3, and the same parts are identified with the same reference numerals.

It will be appreciated that the housing 1 defines a cavity 14 which is bounded by the tube 2 and the end plates 3,4. Received within the cavity are two annular elements 15,16. The annular elements 15,16 each have an outer periphery that has a diameter which is substantially equal to the internal diameter of the tube 2. Two parallel grooves 17,18 are formed in the outer periphery of each of the annular elements 15,16 and a sealing "O"-ring of resilient material 19 is received within the groove 17 and a corresponding sealing ring 20 is received within the groove 18.

The annular elements 15,16 each define a respective central opening 21 of frusto-conical or tapering form, with the opening being directed towards the center of the cavity 14.

At diametrically opposed positions, the outer-most peripheral surface of the annular element 15, and also the annular element 16, is provided with internally threaded openings 22,23 which communicate, respectively, with bores 24,25 which open into the central tapering opening 21 formed in the annular member. Received within the threaded opening 22 is a connector 26 which passes through the aperture 6 formed in the pipe 2, and received within the opening 23 is a connector 27 which passes through the aperture 7 formed in the pipe 2.

It is to be noted that the annular elements 15,16 are of mirror configuration.

A rotor assembly 30 is provided having a substantial portion received within the chamber 14 defined by the housing 1. The rotor assembly 30 comprises two outwardly directed opposed trunions 31,32. An axial bore 33 extends through the trunions 31,32, the terminal bore portions 34,35 being threaded. The trunions 31,32 support a body 36 which is located within the cavity 14, the body 36 having a central region with a relatively large external diameter, the body tapering to a smaller diameter, from that central region towards the trunions 31,32, so that the body is received within the frusto-conical, or tapering openings 21, formed in the annular elements 15 and 16. The nature of the frusto-conical openings 21 and the tapering faces of the body 36 are such that the openings 21 are in substantially sealing contact with the tapering faces of the body 36. The body 36 is provided, at the junction between the tapering faces and each trunion with a larger diameter seat 37, which corresponds with and lies adjacent the seat 12 of the end plate 3, and a smaller diameter seat 38 which lies adjacent and corresponds with the smaller diameter seat 11 of the end plate 3. Resilient seals 39 are provided which are located within the seats 12, 38, and bearings 40 are provided located in the seats 11 and 38.

The body 36 is thus mounted for rotation about the axis of the trunions 31, 32 in the housing 1.

The body 36 defines a first laterally extending passage 41 which extends substantially radially from a central part of the bore 33, and extends through the body 36 and is, in one rotational position of the body 36, (as shown in FIG. 1) in alignment and communication with the bore 24 associated with the connector 26 of the annular element 16. The body 36 is also provided with a second radially extending passage 42 which, in the said one rotational position of the body 36 extends from a central portion of the bore 33 radially outwardly to be in alignment and in communication with the bore 25 associated with the connector 27 of the annular element 15.

It is to be appreciated that the arrangement is such that on rotation of the body 36 by 180°, the passage 41 will be aligned with the bore 25 associated with the connector 27 of the annular member 16, whereas the passage 42 will be aligned with the bore 24 associated with the connector 26 of the annular element 15.

A probe 50 is provided which is mounted within the axial bore 33 of the trunion 31. The probe 50 is of elongate form, and has a terminal portion 51 having a diameter which is less than the diameter of the axial bore 33. Adjacent the terminal portion 51, the probe has a portion 52 having a diameter which is substantially equal to the internal diameter of the bore 33. An annular groove 53 is provided adjacent the junction between the terminal portion 51 and the central portion 52 of the probe 50. The groove 53 contains a resilient sealing "O-ring" 54.

At the other end of the probe, the exterior of the probe is provided with threading 55. The threading is adapted to engage with the threaded end portion 44 of the axial bore 33. A lock nut 56 is also provided which engages the threading 55. It is to be appreciated that the position of the probe relative to the main part of the rotatable assembly 30 may therefore be adjusted.

The probe incorporates a pair of mutually insulated electrically conductive elements 57,58 which terminate at an end face 59 defined at the end of the relatively small diameter terminal portion 51.

A probe 60 is provided which is associated with the trunion 32. The design of the probe 60 generally corresponds with the design of the probe 50, and consequently the probe 60 will not be described in detail.

Because the positions of the probes relative to the main part of the rotatable assembly may be axially adjusted, the volume of the chamber defined by the part of the axial bore 33 between the inner ends of the probes may be selected to be a desired volume. Of course, even if only one probe was adjustable the volume of the chamber may be adjusted.

Located within the chamber defined by the part of the bore 33 between the two probes is a shuttle 61. The shuttle has a main cylindrical portion 62 with a diameter equal to the diameter substantially of the bore 33, and two terminal portions 63,64 of reduced diameter. The diameter of the terminal portion 63, 64 may be the same as the diameter of the terminal portion 51 of the probe 50. The shuttle is a sliding, yet substantially sealing fit within the bore 33.

It is to be appreciated that a relatively small volume pressure chamber 70 is defined between the inner face of the end plate 3, and an exposed side face of the annular element 15. The pressure chamber 70 communicates with the threaded passage 13. A similar pressure chamber 71 is defined which is associated with the end plate 4 and the annular element 16.

Hydraulic fluid under pressure, may be supplied to the pressure chambers 70 and 71, through connectors connected to the threaded passages 13 in the end plates 3 and 4, thus applying a force thrusting or biasing the annular elements 15 and 16 axially inwardly relative to the housing 1, thus bringing the tapering faces of the annular elements 15,16 which define the frusto-conical opening firmly into engagement with the exterior tapering faces of the main body 36 of the rotatable assembly 30. The seals 39 provided in the seats 37 and 12 prevent this hydraulic fluid from escaping. The seals 19,20 minimize the risk of the fluid traveling axially, within the housing, from the pressure chambers 70, 71. The apertures 6, 7 and 8, 9 provided in the tube 2 permit a slight axial movement, relative to the axis of the tube 2, of the connectors 26, 27 which are associated with the annular elements 15,16. Alternate means of applying a force to the annular elements 15,16 may be used, in other embodiments of the invention, to bias the annular elements inwardly.

In the described embodiment the tube 2 is provided with a further threaded opening 72 which communicates with a space 73 defined between the adjacent faces of the annular members 15 and 16 to receive a connector to drain away any fluid that weeps into the space 73.

The opening 72 will be connected to a sensor adapted to sense the fluid that weeps into the space 73. The amount of weeping fluid represents the degree of wear of the components of the metering valve. The sensor may generate a signal when the amount of weeping fluid or the rate of weeping fluid flow reaches a predetermined threshold. The signal may be used to indicate that the metering valve should be services or, in particularly sensitive applications, the signal may be used to terminate operation of the metering valve.

At this stage it is important to note that in this embodiment the shuttle 61 is formed an electrically conductive material or, at least, has end faces of the reduced diameter terminal portions 63, 64 formed of conductive material. The arrangement is such that should the shuttle 61 contact the end face 59 of the probe 50, it will complete an electric circuit between the two mutually insulated electrically conductive elements 57, 58. Similarly, should the shuttle 61 contact the end face of the probe 60, it will again complete an electric circuit.

In a modified embodiment of the invention the entire shuttle may be conductive, and also the body 36 of the rotatable assembly. Each probe will have a single conductive contact provided at the reduced diameter end. When the shuttle touches the probe, a circuit which includes the main body 36 of the rotor assembly, the shuttle and the probe is completed.

Figure 2:
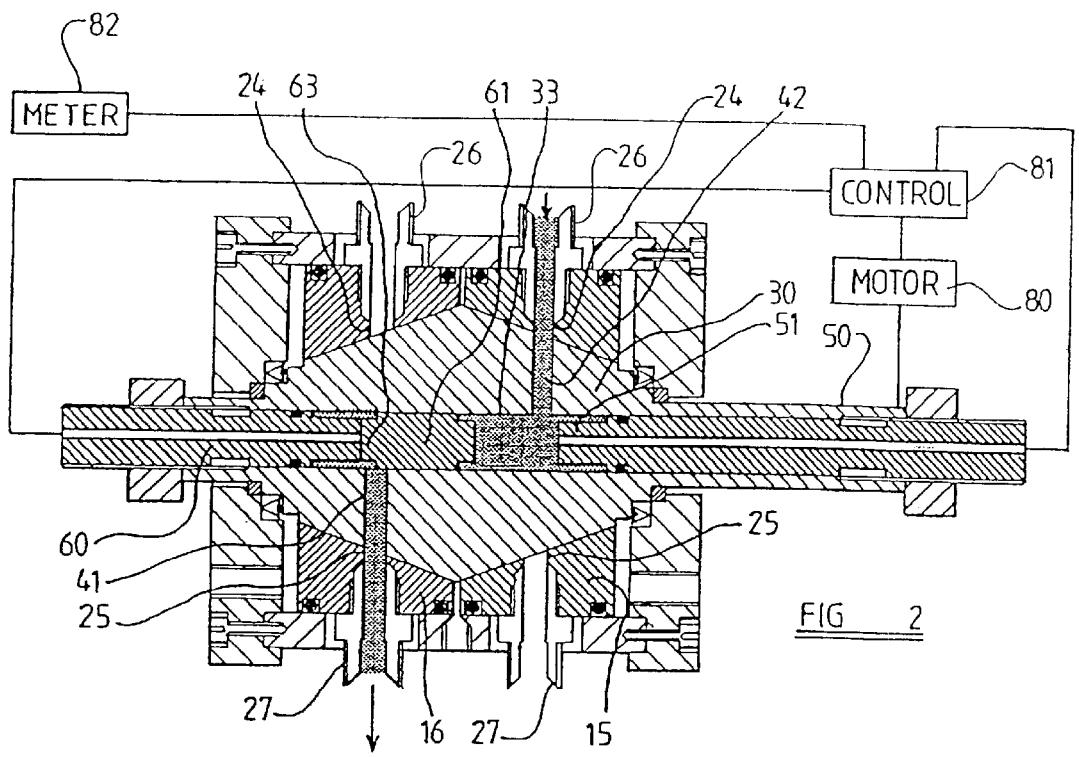
FIG. 2 is a view illustrating the body of FIG. 1, again in section, incorporating, in block diagram form, additional components of a complete metering device.
Figure 3:
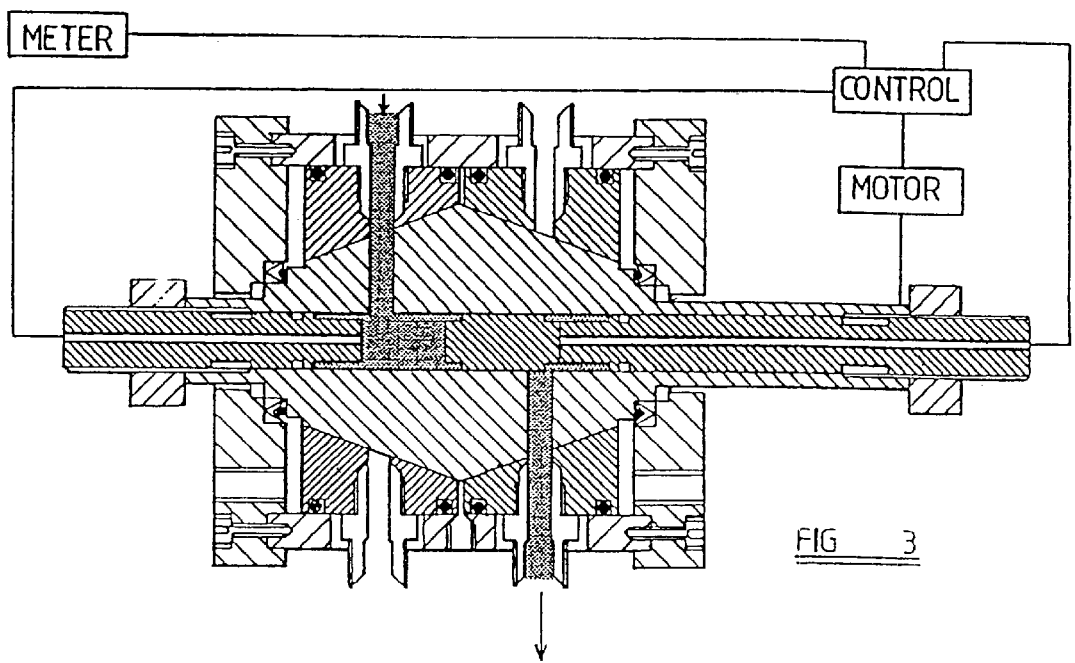
FIG. 3 is a sectional view corresponding to FIG. 2, illustrating the valve components of the device in an alternative position.

Referring now to FIGS. 2 and 3 of the accompanying drawings, it is to be appreciated that the housing 1, as described above, with reference to FIG. 1, will be associated with a motor 80 which is adapted to rotate the rotor assembly 30. The motor, in this embodiment, is adapted to rotate the rotor assembly 30 step-wise by precisely 180°. The motor is activated by a control 81. The control 81 is adapted to receive a signal from the probe 50 when the shuttle 61 contacts the probe 50, and also is adapted to receive a signal from the probe 60 when the shuttle 61 contacts the probe 60. The control arrangement may be associated with a meter 82, which may be a flow rate meter.

When the illustrated arrangement is in use, the arrangement is "primed", and the connectors 26 of the annular elements 15 and 16 are both connected to a source of fluid to be metered, whereas the connectors 27 associated with the annular elements 15 and 16 are each connected to a point where the dispense fluid is to be utilized.

In a cycle of operation of the illustrated device, initially the rotor assembly 30 is in the position illustrated in FIG. 2 in which the passage 42 is aligned with a first fluid inlet in the form of the bore 24 associated with the connector 26 of the annular element 15 which is acting as a fluid entry conduit leading to an entry port in the side wall of the chamber defined by the axial bore 33, whereas the passage 41 is aligned with a first fluid outlet, the bore 25 associated with the connector 27 of the annular element 16, the bore 25 acting as an exit conduit for fluid and defining an exit port in the side wall of the chamber defined by axial bore 33. In the condition illustrated in FIG. 2, fluid has entered the central portion of the axial bore 33, moving the shuttle 61 towards the left. The terminal portion 63 of the shuttle 61 has just touched the end of the probe 60. This causes the completion of an electrical circuit, and consequently a signal is provided to the control 81. The control 81 consequently actuates the motor 80 to rotate the rotor assembly 30 by 180°.

As the rotor assembly 30 rotates, the passages 41 and 42 are sealed.

The rotation of the rotor assembly 30 through 180° brings the passage 41 into alignment with a second fluid inlet in the form of a bore 24 associated with the connector 26 of the annular element 16, and brings the passage 42 into alignment with a second fluid outlet in the form of the bore 25 associated with the connector 27 of the annular element 15. Pressurized fluid entering the illustrated arrangement through the connector 26 of the annular element 16 is introduced into the annular space that surrounds the projecting reduced diameter terminal portion 63 of the shuttle 61, and the reduced diameter end portion of the probe 60 which corresponds with the portion 51 of the probe 50. Thus the fluid, under pressure, acts on the surface area of at least part of the end of the shuttle 61, so as to move the shuttle 61 to move towards the right as shown in FIG. 2. The shuttle is shown in FIG. 3 as having moved to the right with the terminal portion 64 of the shuttle against and in contact with the end face 59 of the probe 50.

As the shuttle moved to the right, a precisely predetermined volume of fluid which was initially contained within the part of the bore 33 between the shuttle 61 and the probe 50 was caused to flow out of the connector 27 associated with the annular element 15.

When the shuttle reaches the end position, as shown in FIG. 3, an electrical signal is provided from the probe 50 to the control 81 which again causes the motor 80 to rotate the rotor assembly 30 by 180°. The rotor assembly 30 is thus returned to the position as shown in FIG. 2. Fluid then enters the arrangement through the connector 26 associated with the annular element 50, causing the shuttle to move to the left as shown in FIG. 2, whilst simultaneously discharging another precisely predetermined volume of fluid through the connector 27 associated with the annular element 16.

The meter 82 receives signals from the control 81, and may provide an output indicating the flow rate, in terms of volume per period of time, or may provide an output in terms of the total volume passed through the illustrated arrangement since initiation of operation, or since initiation of an operating cycle.

It is to be understood that should, for any reason, the shuttle 61 not complete a full stroke when shuttling between the end faces of the probes 50 and 60, the shuttle will not make contact with the terminal portion of the appropriate probe, and consequently the control 81 will not receive a signal to activate the motor 80. In this case the arrangement will automatically stop and thus no further fluid will be metered.

The described embodiment of the invention has the advantages that the faces of the tapering openings of the annular elements are biased or pressed, by a hydraulic force, firmly against the conical faces present on the rotor, thus providing an effective seal across the abutting face areas. The rotor itself acts as a valving member, since when the rotor is in a position such that either the passage 41 or the passage 42 (in the described embodiment) is aligned with a fluid entry or a fluid exit flow is permitted, whereas if the passage is in another orientation, the end of the passage on the exterior of the frusto-conical surface of the rotor is effectively seated by tapering opening the frusto-conical seat formed within the annular member.

Figure 4:
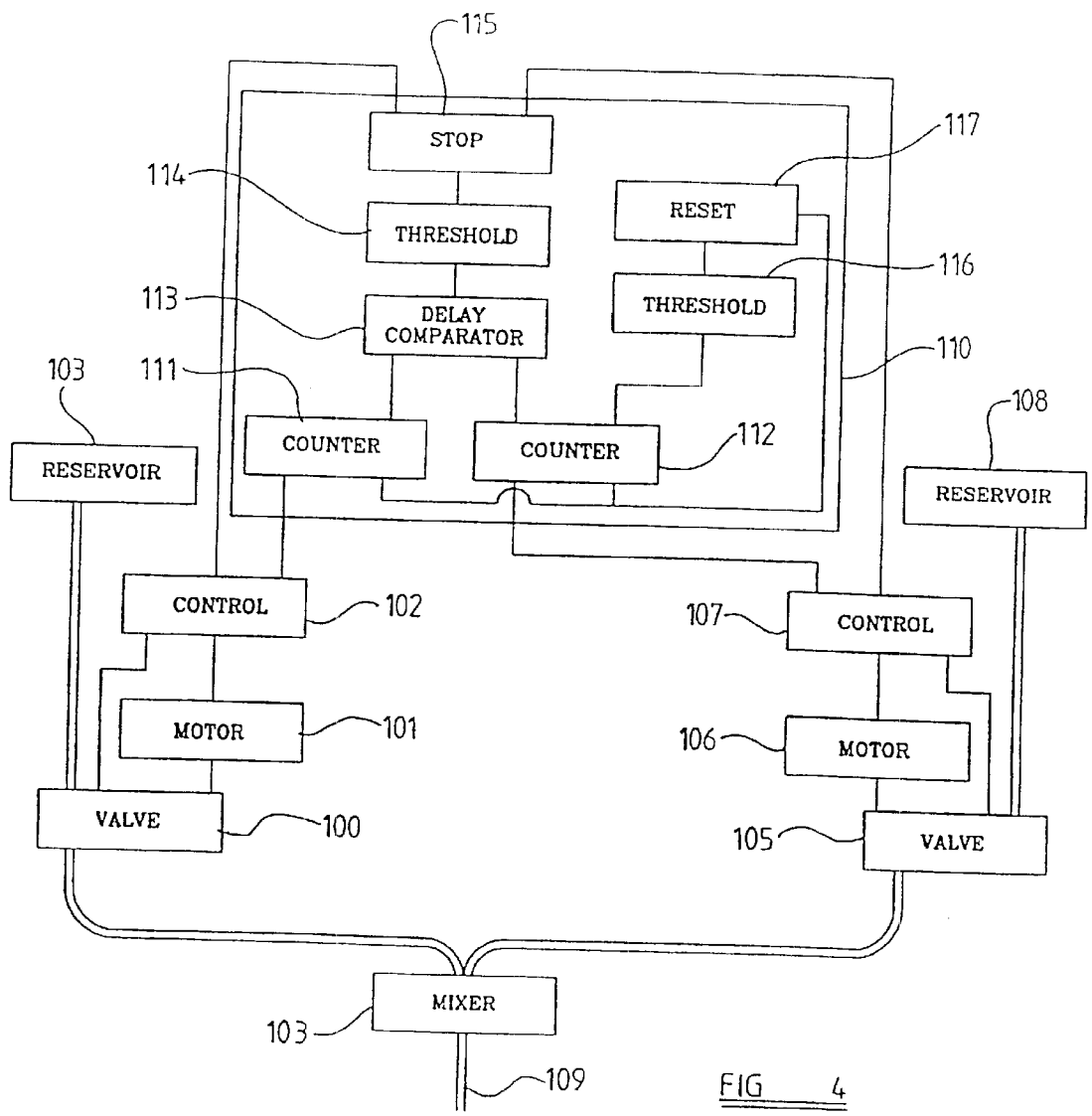
FIG. 4 is a block diagram illustrating two devices of the type illustrated in FIGS. 1 to 3 incorporated in an apparatus for dispensing two fluids.

Referring now to FIG. 4 of the accompanying drawings, a first device 100 of the type described above is illustrated together with the associated motor 101 and control 102, adapted to meter fluid from a reservoir 103 to a mixer 104.

A second device 105, again of the type described above, with an associated motor 106, and a control 197 is also provided adapted to dispense fluid from a second reservoir 108 to the mixer 104. The mixer 104 is provided with an outlet 109 to direct the mixed liquids which may form a two-component material to an appropriate point.

Each of the control arrangements 102, 107 is connected to a supervising control arrangement 110. The supervising control arrangement 110 incorporates two counters 111, 112, with the counter 111 being connected to the control 102, and adapted to count the control pulses generated by the control 102 as supplied to the motor 101, and with the counter 112 connected to the control 107 adapted to count the control pulses generated by the control 107 and supplied to the motor 106.

It is to be appreciated that the two fluids may not be mixed in equal proportions, and consequently it may be intended that for example, the valve 100 may dispense five times as much fluid as the valve 105, meaning that when the apparatus is working in the intended manner, the counter 111 will achieve a count which is five times as high as that of the counter 112. The outputs of the two counters are supplied to a delaying comparator 113. The comparator compares the counts present in the two counters, but only after a predetermined period of operation so that the comparator does not compare the counts when both the counters have recently been re-set to zero.

The output of the comparator is provided to a threshold circuit 114 which determines whether the ratio between the counts present in the counter 111 and 112 is within an acceptable range. If the ratio of the counts within the two counters 111, 112 is not within an appropriate range, which will be indicative of the fact that one of the counters has stopped operating, due, for example, to jamming or incorrect operation of the shuttle of the associated valve, the threshold circuit 14 will provide an output to a stop circuit 115. The stop circuit 115 is connected to the control 102 and the control 107, and will provide the effect of stopping the associated motors 101, 106.

Consequently, if the metering devices are being utilized to mix two fluids with a precisely predetermined ratio of mix, should either of the devices fail for any reason, the supply of liquids to the mixer will be terminated, meaning that no incorrectly mixed material will be dispensed.

It is to be understood that the delay present in the delay comparator 113 should be shorter than the period of time taken for the metered material to travel from the valves 101, 105 to the mixer 104.

In order to prevent the counts in the counters 111, 112 becoming too large, one counter 112 is associated with a threshold circuit 116 adapted to determine when the count in the counter 112 reaches a predetermined threshold. When the threshold is reached, the threshold circuit 116 provides an output to a re-set circuit 117, which then re-sets the counters 111 and 112 to zero.

Figure 5:
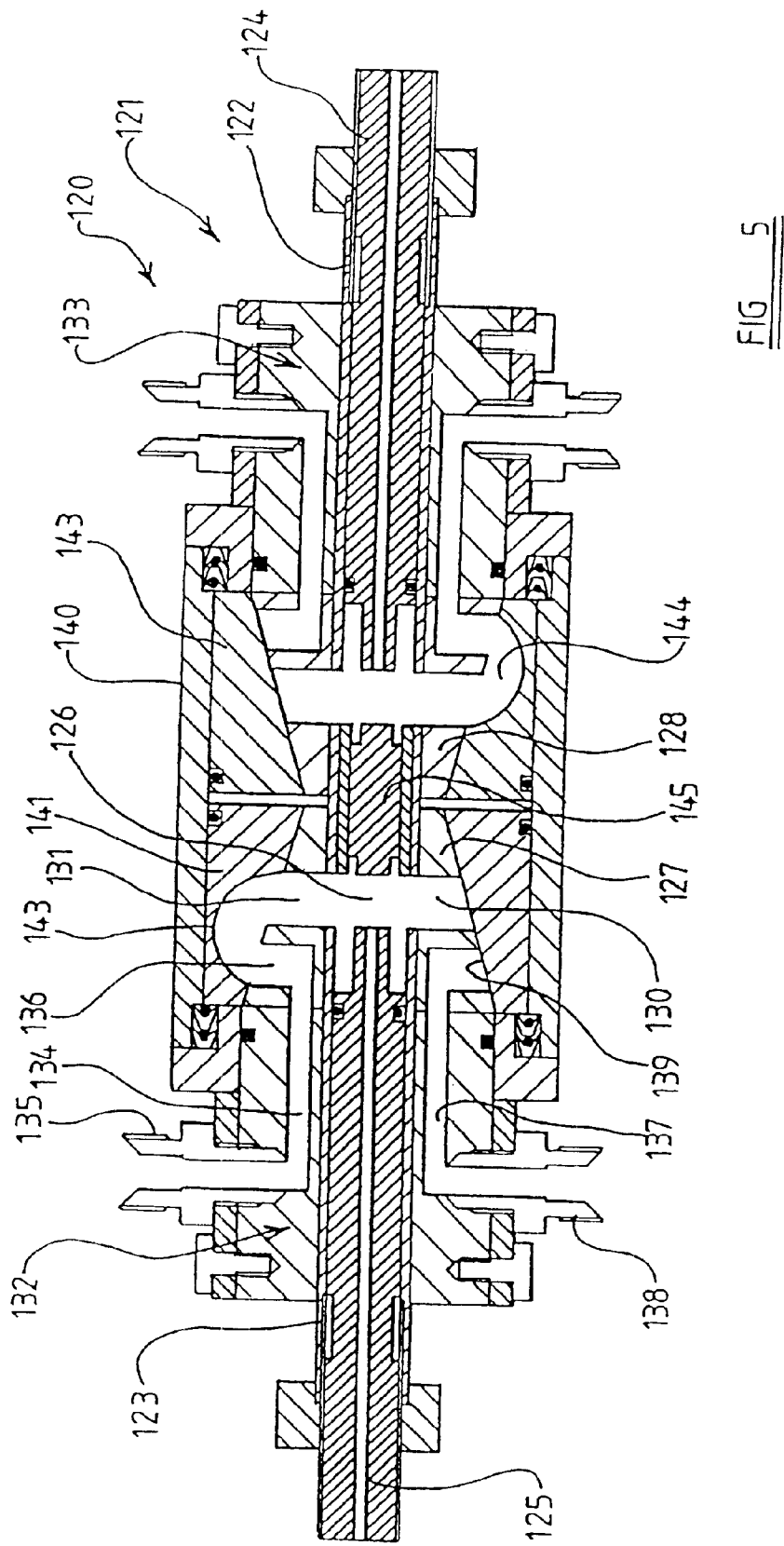
FIG. 5 is sectional view of the main part of an alternative embodiment of the metering device.

FIG. 5 illustrates a modified form of housing 120 that constitutes an alternative embodiment of the invention. In this embodiment of the invention, trunions and probes are provided similar to the trunions and probes of the embodiment described above, but, in this embodiment, the trunions and probes are mounted to be stationary, and part of a housing is intended to rotate.

Thus, as shown in FIG. 5, the assembly comprises a fixed unit 121, which comprises outwardly directed trunions 122, 123, each provided with an adjustably positioned probe 124,125, the probes extending into a chamber 126 defined within a bore extending through the trunions 122,123. The central part of the bore defining the chamber 126 is surrounded by fixed elements 127, 128, each of frusto-conical form, the elements having their narrower ends immediately adjacent each other.

Each of the frusto-conical elements 127,128 is provided with two diametrically opposed passages 130,131, which each communicate with the chamber 126. The passages terminate at diametrically opposed points in the tapering outer face of the elements 127, 128.

The frusto-conical element 127 is associated with a further element 132, whilst the frusto-conical element 128 is associated with a further element 133 of corresponding design, with the further elements 132, 133 extending axially outwardly away from the frusto-conical elements 127, 128 and surrounding the trunions 121,123. The further element 132 defines an inlet passage 134 for fluid to be metered, which is connected to a connector 135. The inlet passage 134 has its end 136 located on the tapering face of the frusto-conical element 127 at a point 136 adjacent but slightly spaced from the point at which the passage 131 intersects the tapering face. The further element 132 also defines an outlet passage 137 for fluid to be dispensed which is associated with a connector 138, the outlet passage 137 terminating at a point 139 adjacent but slightly spaced from the point at which the passage 130 intersects the tapering face of the frusto-conical element 127.

A rotor assembly 140 is provided carrying members 141,142, each of which defines a frusto-conical seat receiving, in a sealing manner, one of the frusto-conical members 127, 128. The members 141, 142 will be biased apart, and thus into firm engagement with the frusto-conical elements 127, 128 by a hydraulic fluid supplied to the annular space between the members 141, 142 or by a spring located between the members 141, 142. Part of the frusto-conical seat is recessed 143, and the arrangement is such that when the rotor assembly 140 has a predetermined rotational position, the recess 143 forms a communication between the end 136 of the inlet passage 134, and the passage 131 leading to the chamber 126. When the rotor assembly is in this position, it is to be appreciated that a corresponding recess 144 provided on the element 142 forms a communication between the other end of the chamber 126 and an outlet for fluid to be dispensed. When the rotor assembly 140 is rotated by 180°, it is to be appreciated that the situation is reversed, and the recess 143serves as a communication between the chamber 126 and the outlet connector 138, whereas the recess 144 will serve as a communication between the other end of the chamber 126 and an inlet connector 146.

It is to be observed that a shuttle 145 is provided located as a slidable, but sealing fit, within a part of the bore that extends through the trunions 122, 123 which serves to separate the part of the chamber 126, associated with the passages 130, 131 in the member 141 from the opposite end of the chamber 126 associated with the corresponding passages provided in the member 142.

As in the previously described embodiment of the invention, each probe 124, 125 is provided with electrically conductive means adapted to be engaged by an end portion of the shuttle 145, as the shuttle completes a stroke during operation of the device, and consequently the arrangement illustrated in FIG. 5 may be used with a motor and control arrangement of the type described in FIGS. 2, 3 and 4.

As can be seen, if fluid is introduced to the arrangement of FIG. 5, initially the fluid will enter through the connector 135, associated with the member 132, and will initially cause the shuttle 145 to move towards the right until the stroke of the shuttle is complete. The rotatable assembly 140 will then rotate and fluid will then enter through the connector associated with the element 133 causing the shuttle to move towards the left, whilst simultaneously dispensing fluid previously introduced to the chamber 126 through the connector 138 associated with the member 132. Once the illustrated arrangement has reached a steady state of operation, a precisely metered quantity of liquid will be dispensed during each stroke of the shuttle 145.

Figure 6:
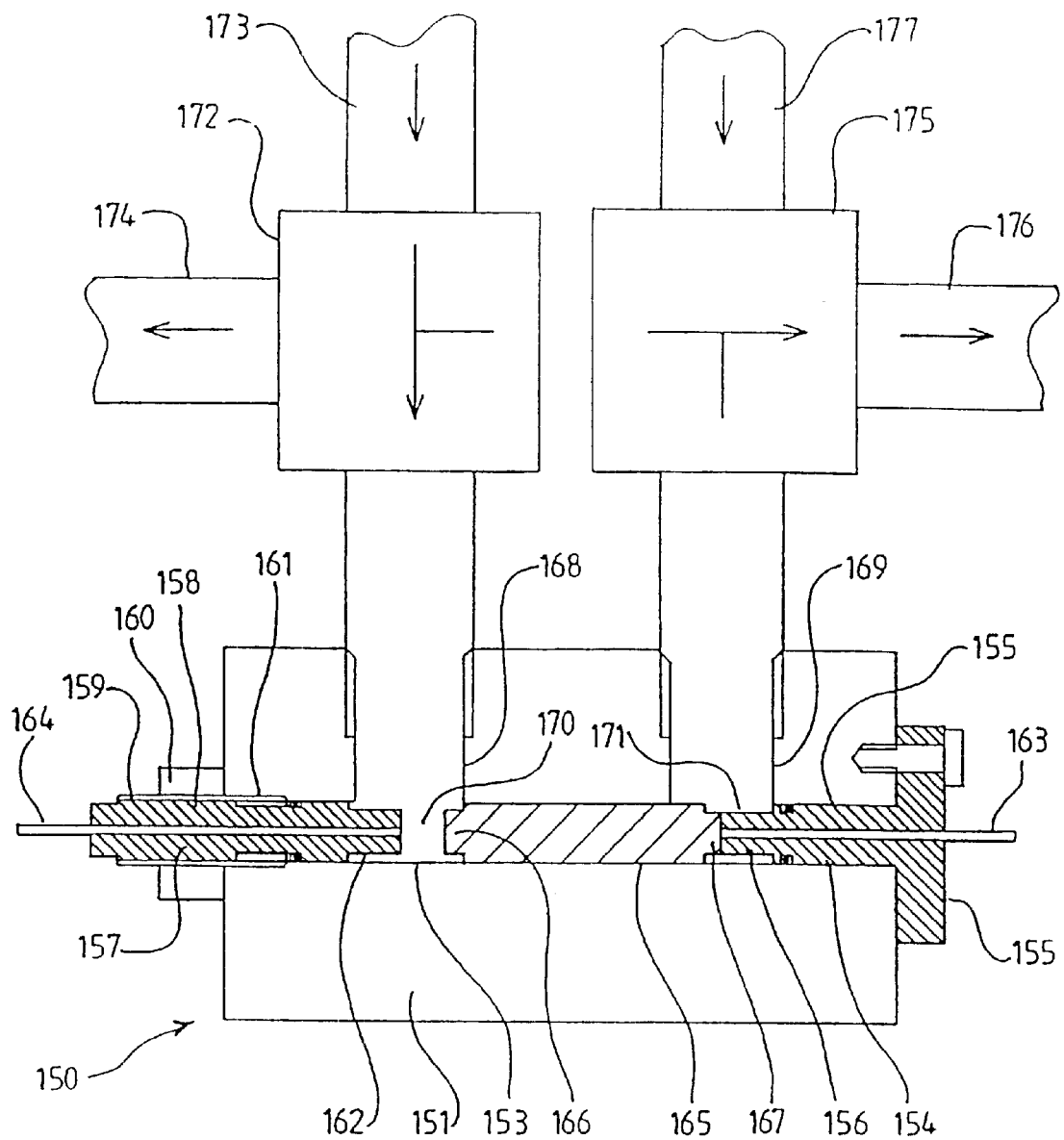
FIG. 6 is a diagrammatic sectional view of another metering device.

Referring to FIG. 6, an alternative embodiment of the invention is illustrated in which a valve arrangement is utilized which in some respects is somewhat simpler than the valve arrangement utilized in the embodiments described above.

Referring to FIG. 6, a housing 150 is provided in the form of a block 151 having a transversely extending bore 153. At one end the bore is closed by a probe 154. The probe 154 is carried by an end plate 155 secured to an end face of the block 151. The generally cylindrical probe 154 extends from the end plate 155 into the bore. The probe 155 terminates with an inner end portion 156 of reduced diameter. It can be seen that the probe 154 is fixed in position and is not adjustable.

At the other end of the bore, an adjustable probe 157 is provided, the probe 157 incorporating a probe element 158 having a threaded portion 159 on the exterior of the block 151, there being an adjusting nut 160 on the threaded portion. The threaded portion 159 is inserted into a threaded end part 161 of the bore 153. The inner end portion of the probe 162 is of reduced diameter.

It is to be noted that the probe 154 is provided with an electrical conductor 163 which extends to the inner end face of the probe, and the probe 157 is provided with a conductor 164 which extends to the inner end of the probe.

A shuttle 165 is provided comprising a generally cylindrical body having reduced diameter ends 166, 167. The shuttle is provided as a sealing fit within the chamber defined by the part of the bore 153 between the opposed inner ends of the probes 154, 157. At least the end faces of the shuttle are formed of conductive material.

The block 151 defines two transversely extending passages 168, 169. The passage 168 intersects the bore 153 and defines a flow port 170 in the side wall of the chamber 153. It can be seen that the reduced diameter end 162 of the probe 157 extends across the flow port. Similarly, the passage 169 defines a flow port 171 and the probe 154 has the reduced diameter end 156 thereof positioned to extend across the flow port 171.

The passage 168 is connected to a first three-way valve 172 which is adapted selectively to connect either a liquid entry conduit 173 to the passage 178, or a liquid exit conduit 174 to the passage 168.

Similarly the passage 169 is connected to a three-way valve 175 adapted to connect either a liquid exit passage 176 or a liquid inlet passage 177 to the passage 169.

It is to be appreciated that the electrical conductors of the probes will be connected to a control arrangement similar to that described above. In use of the valve shown in FIG. 6, with the shuttle 165 in the right-hand position as shown, the three-way valve 175 will be adjusted so that the liquid entry conduit 177 is connected to supply liquid to the chamber defined by the bore 153, whilst the three-way valve 172 connects the chamber to the liquid exit conduit 174. Liquid will flow through the three-way valve 175 into the chamber, moving the shuttle to the left, and liquid will flow out of the chamber through the three-way valve 172 and into the liquid exit conduit 174. When the shuttle reaches the left-hand-most position as shown in FIG. 6, the position of the two valves is reversed and liquid from the liquid entry passage 173 will flow into the chamber moving the shuttle towards the left whilst liquid will leave the chamber flowing through the valve 175 into the liquid exit passage 176.

Figure 7:
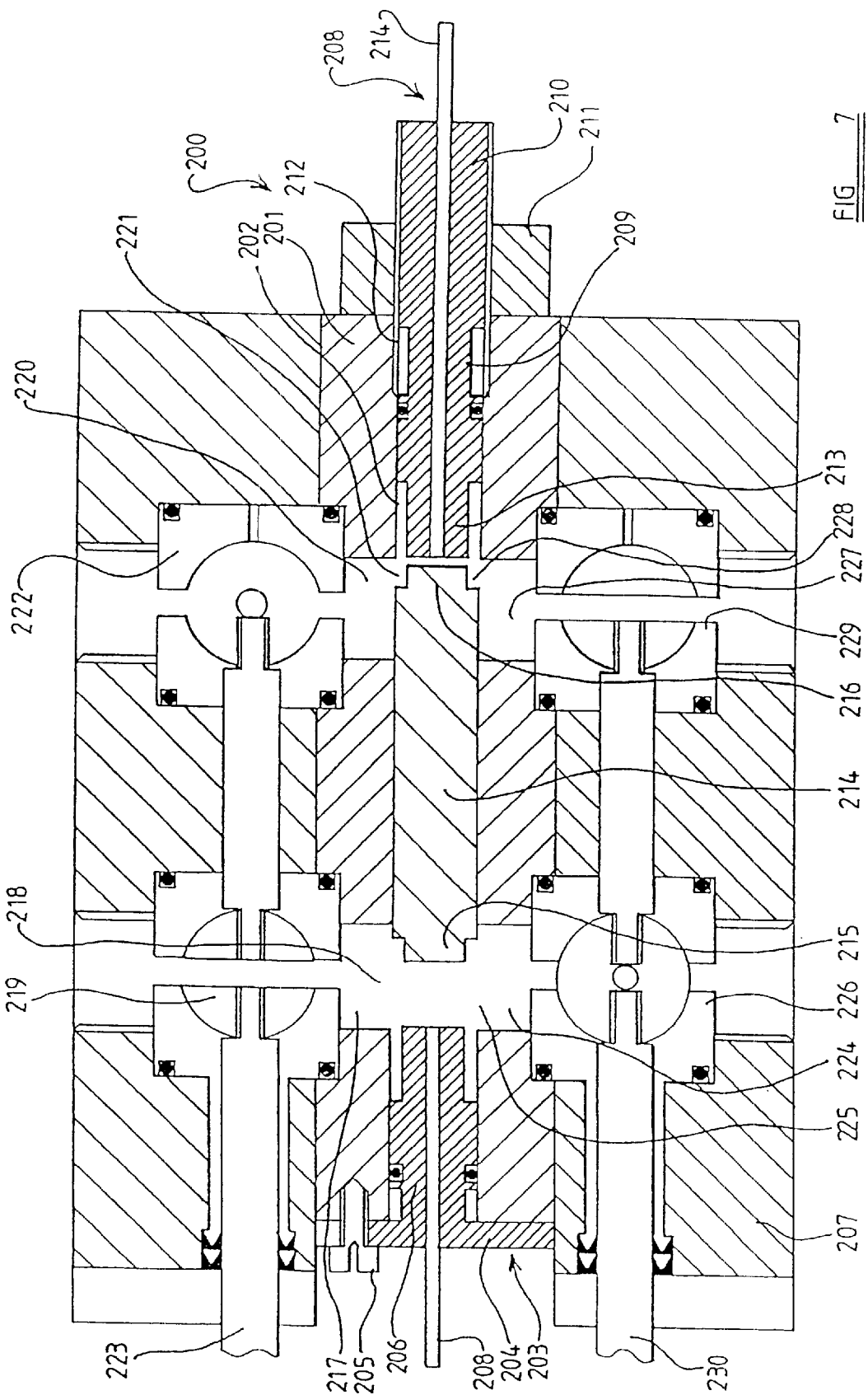
FIG. 7 is a diagrammatic sectional view of yet another metering device.

FIG. 7 illustrates a further embodiment of the invention. In this embodiment of the invention the unit 200 defines a block 201 defining an axial bore 202. Mounted at a fixed position at one end of the bore 202 is a fixed probe 203. The fixed probe 203 comprises an end, plate 204 connected by means of a screw 205 to one end face of the block 201. A generally cylindrical probe portion 206 extends into the bore 202. The probe portion 206 has a reduced diameter end 207. An electrical conductor 208 is provided which extends axially of the probe and terminates at the end face of the reduced diameter portion 207.

At the opposite end of the bore, an adjustable probe is provided. The adjustable probe comprises a generally cylindrical probe element 209, one end of which is provided with exterior threading 210. The exterior threading engages in a lock nut 211 provided on the exterior of the block 201 and the terminal part of the threaded portion 210 also engages with a threaded end region 212 of the bore 202. The inner end 213 of the probe is of reduced diameter. A conductor 214 is provided which extends axially of the probe terminating at the end face of the reduced diameter portion.

A shuttle 215 is provided comprising a generally cylindrical body which is a sliding sealing fit within the bore 202. The shuttle has reduced diameter end faces 216. A chamber is defined by the portion of the bore 202 between the inner ends of the two probes 203, 208. The first end of the chamber is associated with a transversely extending fluid entry passage 217 which defines a fluid entry port 218 in the side wall of the chamber which contains the shuttle 214, there being a rotary ball valve 219 provided in that passage 218 movable between the first position in which a fluid flow is permitted, and a second position in which a fluid flow is prevented. The other end of the chamber is associated with a second fluid inlet passage 220 which forms a fluid inlet port 221 in the side wall of the chamber that contains the shuttle. The passage 220 is associated with a ball valve 222 which is again movable from a position in which it permits a fluid flow to a position in which no fluid flow is permitted. The ball valves 219, 222 are driven by a common shaft 223 and are so located that when one valve is open to permit a fluid flow, the other valve is closed to prevent a fluid flow.

The first end of the chamber is also associated with a fluid exit passage 224 which defines a fluid exit port 225 in the side wall of the chamber containing the shuttle 214. The fluid exit passage 224 is provided with a ball valve 226 which, in one position permits a fluid flow and which, in an alternate position, does not permit a fluid flow.

The other end of the chamber is associated with a similar fluid exit passage 227 which defines a fluid outlet port 228 in the side wall of the chamber that contains the shuttle. A further ball valve 229 is associated with the passage 227, the ball valve being movable between a position in which a fluid flow is permitted, and a position in which no fluid flow is permitted within the passage. The ball valve 229 and the ball valve 226 are both driven by a common shaft 230, and the arrangement is such that when one valve is open, the other valve is closed.

It is to be understood that the drive shafts 223 and 230 of the ball valves will be driven in synchronism.

In operation of the arrangement shown in FIG. 7, it can be seen that the ball valve 219 in the fluid entry passage 218 is open, and the ball valve 229 in the fluid exit passage 227 is open. Fluid is thus, in the illustrated condition, entering the left-hand end of the chamber, as illustrated, and the shuttle 214 is moving towards the right. When the shuttle has moved a short distance, completing its stroke, the end face of the reduced diameter end portion 216 of the shuttle 214 will contact the probe 208 to generate a signal which will pass through the conductor 214. Both of the shafts 223 and 230 will then be rotated to reverse the position of the valves. The valve 222 in the fluid entry passage 220 will then be open, whilst the ball valve 219 in the fluid entry passage 218 will be closed. Similarly, the ball valve 229 in the fluid exit passage 227 will be closed while the ball valve 226 in the fluid exit passage 224 will be opened. Fluid will thus flow through the ball valve 222 and through the fluid entry passage 220 into the right-hand end of the chamber, thus moving the shuttle 214 towards the left. Fluid will flow out of the fluid exit passage 224 passing through the ball valve 226 until the shuttle has reached the left-hand-most position, when, as the conductive end face of the reduced diameter portion 215 contacts the probe 203, a signal passes through the electrical conductor 208. The position of the valves is then again reversed.

From the foregoing it can be seen that many embodiments of the invention may be devised which have different types of valve arrangement to should be off-set by 360° relative to the other plurality. This will allow the arrangement to meter more often per revolution than that described in detail control the supply of fluid and the exit of fluid from the chamber carrying the shuttle.

Components of the devices described above may be made of ceramic material to minimize problems of wear. The shuttle, in each embodiment, may be provided with a replaceable sleeve so that if the sleeve becomes worn it may be replaced.

It can readily be appreciated that devices of the type shown in FIG. 5, 6 and 7 may be used in a metering arrangement of the kind shown in FIG. 4.

In the described embodiments each probe carries an electric signal when the electrically conductive shuttle makes contact with the inner end of the probe within the chamber.

While the invention has been described with reference to an embodiment in which the rotor has one radial passage 41 to be aligned with the first inlet and the second outlet; and one radial passage 42 to be aligned with the second inlet and the first outlet with this arrangement the rotor body 36 has to rotate 180° between cycles of operation. Thus it may be preferred to provide a plurality of angularly-spaced radial passages aligned with the first inlet and second outlet and a corresponding plurality of radial passages aligned with the second inlet and the first outlet. If the inlets and outlets are diametrically opposed, it is preferred to use an odd number of passages, such as between three and seven or between five and nine passages. If five passages are used the rotor should be rotated 720° between cycles and the passages of one plurality should be off-set by 36° relative to the other plurality. This will allow the arrangement to meter more often per revolution than that described in detail above.

Figure 8:
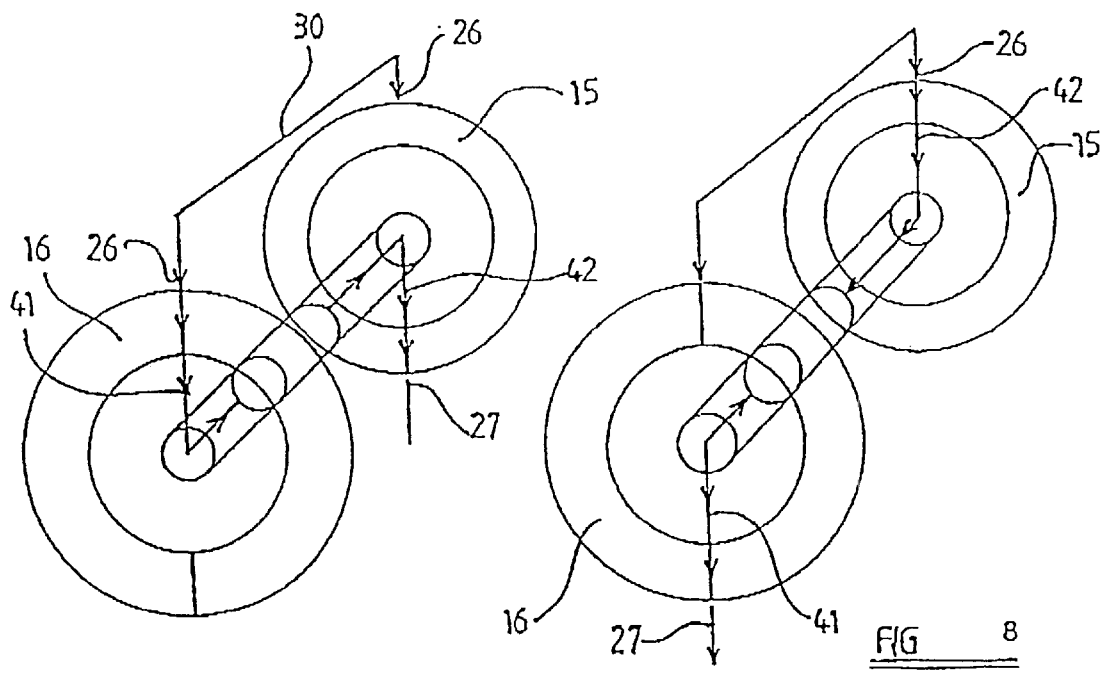
FIG. 8 is a diagrammatic view illustrating a typical embodiment of the invention.
Figure 9:
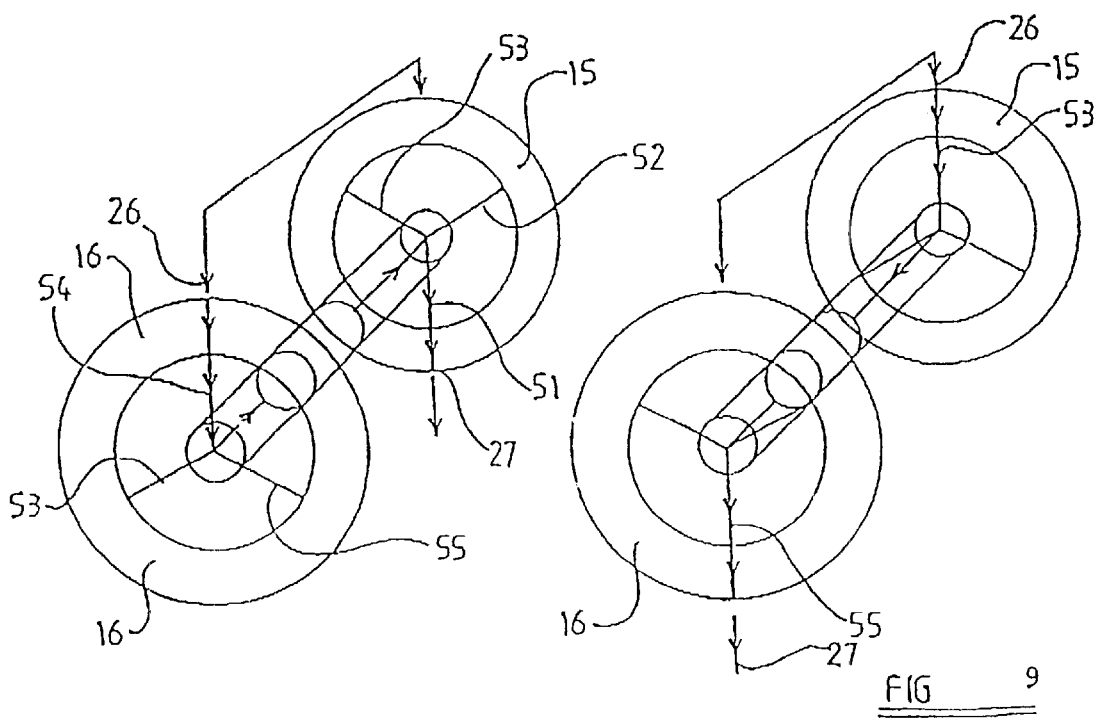
FIG. 9 is a diagrammatic view corresponding to FIG. 8 illustrating a modified embodiment of the invention.

In order that this aspect of the invention may be more clearly understood, reference is now made to FIGS. 8 and 9 of the accompanying drawings.

FIG. 8 is a schematic view illustrating an embodiment such as the embodiment of FIG. 1 showing the rotor of FIG. 1 in two alternate positions. Thus in the embodiment of FIG. 1, a single inlet passage 320 is connected to the connectors 26 associated with the two annular elements 15, 16. When the rotor of the apparatus of FIG. 1 is in the first position, as shown in FIG. 1, a first passage 41 formed at one end of the rotor is in alignment with the connector 26 of the annular element 16, and the second radially extending passage 42 is in alignment with the connector 27 of the annular element 15. On rotation of the rotor by 180°, the situation is reversed in that the first passage 41 provided in the rotor is in alignment with the connector 27 of the annular 16 whereas the second radial passage 42 is in alignment with the connector 26 of the annular element 15.

Referring now to FIG. 9, each rotor is provided with three radially extending passages. The radially extending passages on each rotor are equi-angularly spaced. The radially extending passages in the rotor associated with the annular element 15, shown as the passages 51, 52, 53, are evenly off-set relative to the passages associated with the annular element 16 which identified as passages 53, 54, 55. In the position shown at the left-hand side of FIG. 10, the passage 54 is associated with the connector 26 of the annular element 16, whereas the passage 51 is associated with the connector 27 of the annular element 15. On rotation of the rotor by 60°, a different situation obtains with the passage 53 associated with the annular element 15 being in alignment with the connector 26 associated with that annular element, whereas the passage 55 associated with the annular element 16 is in alignment with the connector 27 of that annular element 16.

It is thus to be appreciated that when the shuttle has effected one movement, the rotor only needs to be rotated by 60° to enable the shuttle to effect the reverse movement. This is in contrast with the arrangement shown in FIG. 9 where a rotation of 180° was necessary.

It is to be appreciated, therefore, that providing multiple passages, a more rapidly acting metering arrangement may be provided. It is, however, important that the number of radial passages provided at each end of the rotor should be an odd number, and it is also desirable that the passages provided at one end of the rotor should be evenly off-set relative to the passages at the other end of the rotor if the inlets and outlets are diametrically opposed.

Figure 10:
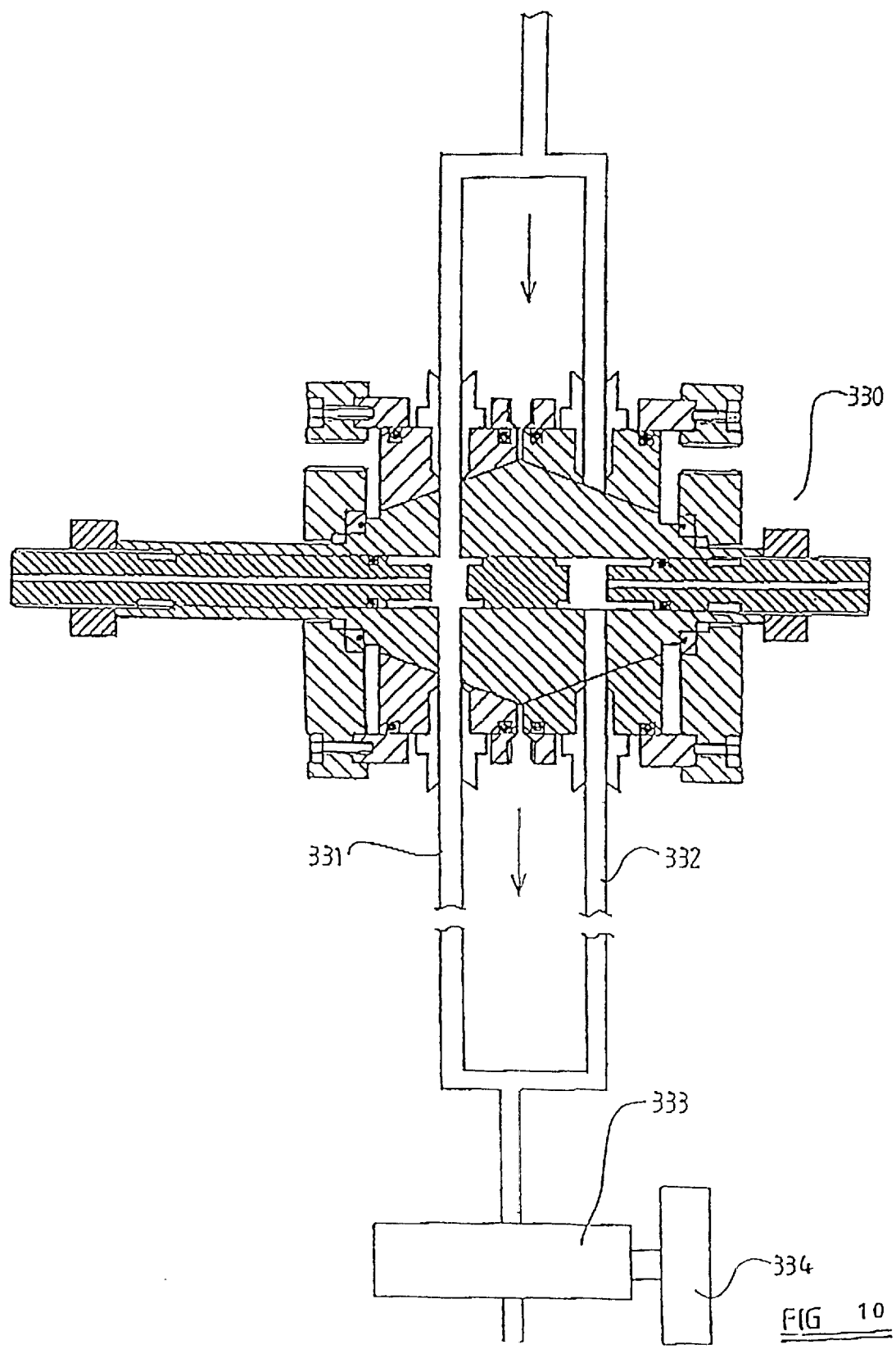
FIG. 10 is a diagrammatic view of an embodiment of the invention similar to that shown in FIG. 1 incorporating a stop valve.

Referring now to FIG. 10 of the accompanying drawings, an arrangement is illustrated in which a metering valve 330 of the type shown in FIG. 1 is illustrated the metering valve having two outlets 331, 332, which are fed to a common stop valve 333. The stop valve is provided with a control 334. The control is adapted to open the stop valve 333 only when the rotor is in such a position that the radial passage within the rotor is in alignment with one of the two outlets from the metering valve 330, and with the other radial passage in communication with a supply of pressurized fluid to be metered. Thus, in other words, the stop valve 333 is only open when the shuttle is moving axially within the metering valve, thus dispensing metered fluid through either the outlet pipe 331 or the outlet pipe 332, Preferably the arrangement is such that the stop valve 333 is closed as soon as the shuttle has terminated its movement and thus the hydraulic pressure within the outlet pipes 331, 332 is maintained at all times. This ensures that the entire system is maintained in a "tight"condition. If no stop valve 333 were provided, fluid could drain away through the outlet pipes 331, 332 leading to an uneven or inaccurate metering.

Figure 11:
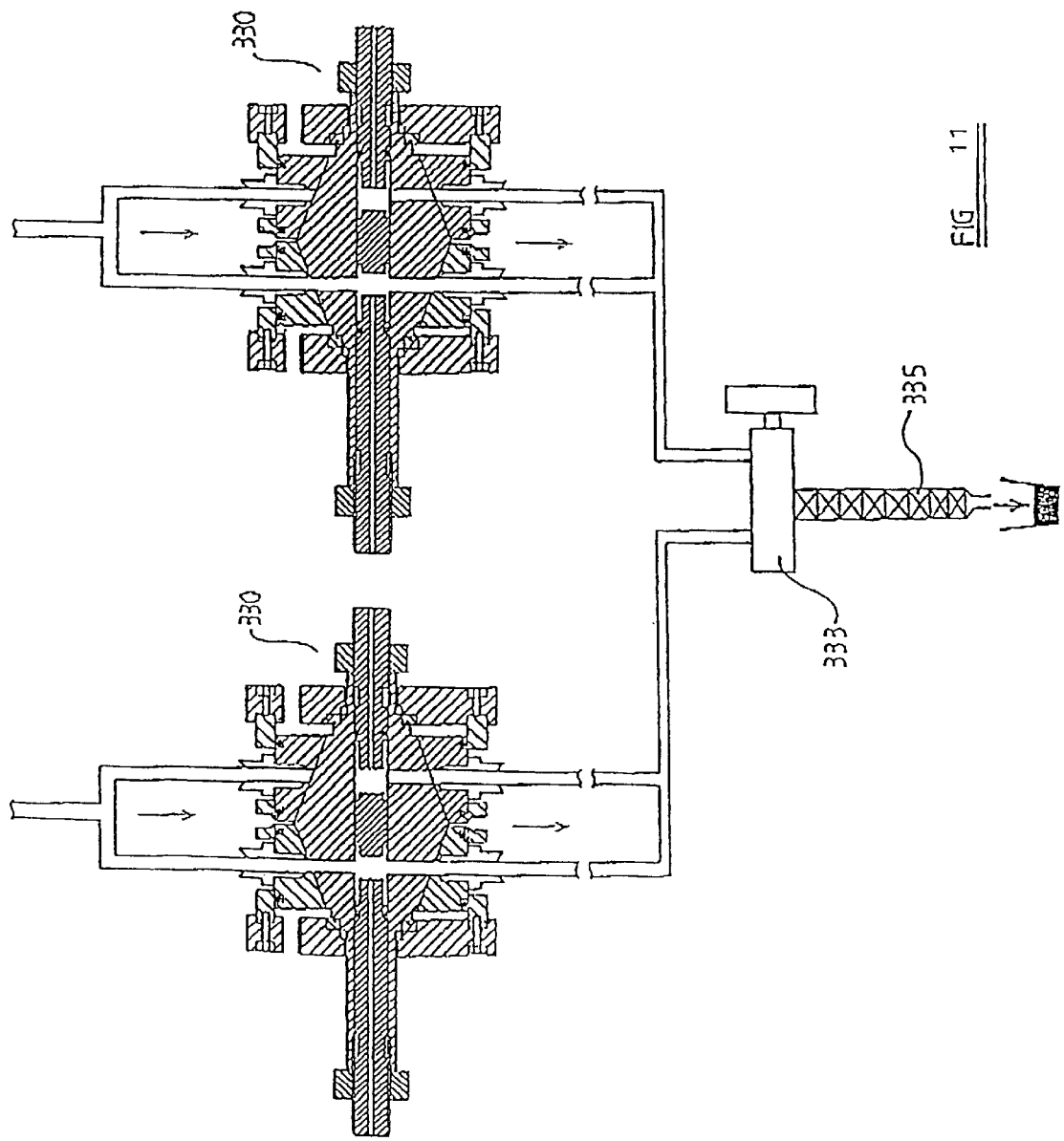
FIG. 11 is a schematic view illustrating two metering valves of the type shown in FIG. 1 incorporating a common stop valve.
Figure 12:
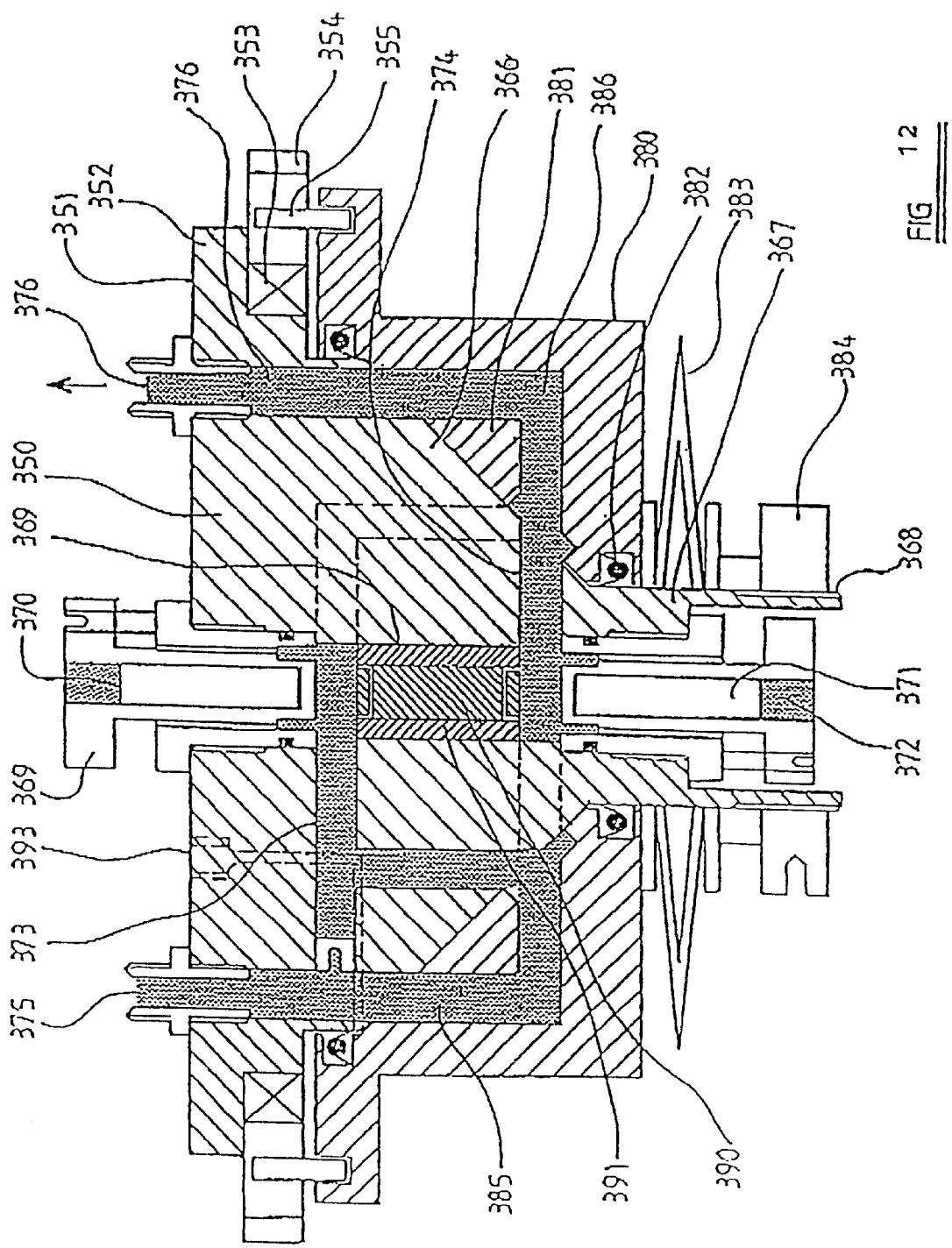
FIG. 12 is a schematic view illustrating a further embodiment of the invention.

FIG. 11 illustrates two metering valves 330 of the type shown in FIG. 12, each having their outlets connected to a commonly operated stop valve 333. Thus hydraulic integrity will be maintained in the outlets from the two metering valves 330. The outlet of the stop valve 333 is connected to a static mixer 335. In this way accurate metered mixing may be achieved.

FIG. 12 illustrates a metering valve which constitutes a further embodiment of the invention. The metering valve comprises a body 350 having a planar upper surface 351. The upper part of the body defines an outwardly extending flange 352. Mounted beneath the flange 352 is a bearing 353 which supports annular drive gear 354 which totally surrounds the body 350. The ring 354 carries a plurality of depending drive pins 355, the purpose of which will become clear from the following description.

A lower part 366 of the body defines a frusto-conical exterior surface. The part 366 which defines the frusto-conical surface terminates in a cylindrical depending neck 367 which is axially located. The lower part of the exterior of the neck is threaded 368.

A bore 369 is provided which extends axially through the neck 367 and axially through the body 350. The upper end of the bore is provided with an adjustable probe 369 provided with electrodes 370. The lower end of the bore is scaled by an adjustable probe 371 with electrodes 372. The bores and electrodes are similar to those described previously. The upper part of the bore, adjacent the probe 369 is connected by means of the cranked passages 373 to points on the frusto-conical exterior of the body 350 adjacent the neck 367. The lower part of the bore 369 adjacent the probe 371 is connected by three radially outwardly extending passage 374 (which are each diametrically opposite one of the passages 373) to further points on the frusto-conical exterior of the body 350, these points being diametrically opposed to the points at which the fast passages 373 reach the frusto-conical surface.

Thus the upper end of the bore defined between the probes is connected to three points on the exterior of the frusto-conical surface, and the lower end of the bore is connected to a diametrically opposed points on the frusto-conical surface.

The body 350 is provided with three equally angularly provided inlet passages, only one of which, 375, is shown in FIG. 12. The three inlet passages each extend vertically downwardly, each terminate at a point on the frusto-conical surface of the body 350. The three inlet passages are equiangularly off-set.

The body 350 is also provided with three equi-angularly off-set outlet passages 3176, which again extend vertically, and the arrangement is such that diametrically opposite each inlet passage 375 is an outlet passage 376.

It is to be appreciated that in alignment with each inlet passage 375, is a passage corresponding to the first passage 373 connected to the upper end of the bore adjacent the probe 369 and in alignment with each outlet passage 376 is a horizontal passage corresponding to passage 374.

A rotor 380 is provided defining a frusto-conical seat 391 which engages with the frusto-cortical exterior surface of the part 366 of the body 350. The rotor is mounted in position by means of bearings 382 which engage the neck 367. A spring 383 engages part of the rotor 380 and also engages nut 384 provided for that purpose on the threading 368. The rotor 380 is thus biased so that the frusto-conical seat therein firmly engages the frusto-conical exterior of the body 350. Defined in the rotor are tow angular passage 385, 386. Each passage is such that, when aligned therewith, it will interconnect an inlet 375 with the aligned passage 373 or an outlet 376 with the aligned passage 374.1

Contained with the bore 369 between the probes is a shuttle 390. The shuttle is provided with an exterior sleeve 391 formed of a material which provides a good sliding fit within the bore. Should the material 391 wear, that material may be replaced.

It is to be noted that the pins 355 provide don the drive gear 354 engage recesses provided for that purpose in the rotor. Thus the rotor may be driven by driving the gear 354. With the rotor in an initial position, as illustrated, fluid flowing through the inlet 37r may pass through the passage 385 defined in the rotor, and thus through the passage 373 to the upper part of the bore, consequently forcing the shuttle 390 downwardly, forcing fluid through the passage 374 and through the outlet 376. When the rotor rotates by 60°, an inlet 375 will be aligned with a passage corresponding to the passage 374 leading to the lower part of the bore and an outlet will be aligned with the passage corresponding to the passage 373 connected to the upper part of the bore and thus the shuttle will move in the opposite sense.

It is to be appreciated that the rotor will rotate only in response to the shuttle physically contacting the probe at each end of the stroke, in the manner described above.

The stator 350 may be provided with a port 393 communicating with the space between the two engaging frusto-conical fares. If there is any weepage of liquid through the port 393, this will be a sign that the metering device is "wearing".

Components of the devices described above may be made of a material to minimize wear.

In the present specification "comprise"means "includes or consists"and "comprising"means "including or consisting of".

The features disclosed in the foregoing description, or the following claims, or the accompanying drawings, expressed in their specific forms or in term of a means for performing the disclosed function, or a method or process for attaining the disclosed result, as appropriate, may, separately, or in any combination of such features, be utilized for realizing the invention in diverse forms thereof.

I claim:

1. A metering device comprising
   means defining a chamber comprised of two opposed ends comprising of elongate bore, each end of the elongate bore accommodating a respective probe, inner ends of which bound the chamber, at least one probe being axially adjustable in position, each probe comprising electrically conductive means extending from the inner end face of the probe,
   inlet means to enable fluid to enter one end of the chamber and inlet means to enable fluid to enter another end of the chamber,
   outlet means to enable fluid to exit from said one end of the chamber, and outlet means to enable fluid to exit from the other end of the chamber,
   a shuttle provided within the chamber at a position intermediate said two ends, of the chamber at least opposed ends of the shuttle being electrically conductive, the shuttle acting sealingly to separate two ends of the chamber, the shuttle being movable between two terminal positions, each probe being responsive to physical contact with the shuttle to generate a respective electric signal when the shuttle reaches each one of said two terminal positions,
   valve means to control fluid flow which, in one condition, permit the entry of fluid into one end of the chamber and permit the simultaneous exit of fluid from the other end of the chamber and which, in another condition, permit the entry of the fluid into said other end of the chamber and permit simultaneous exit of fluid from the said one end of the chamber, and
   control means adapted to change a condition of the valve means on receipt of a said electric signal generated when the shuttle reaches a said terminal position.

2. A metering device according to claim 1 wherein the inlet and outlet means incorporate ports in the side-wall of the chamber and the inner-most end of each probe which defines the chamber is configured to permit the entry or exit of fluid if the inner-most end of the probe is aligned with a said port.

3. A metering device according to claim 1 wherein said shuttle comprises a central part which is a sealingly sliding fit within the chamber, and two terminal end parts of reduced diameter.

4. A metering device according to claim 1, wherein said valve means is comprised of a rotor assembly, said rotor assembly being such that in one position thereof a fluid flow is established between a first inlet and one end of the chamber, and is also established between the other end of the chamber and a first outlet, whereas in a second position of the rotor assembly fluid flow is established between a second inlet and the other end of the chamber, and between said one end of the chamber and a second outlet, the rotor assembly being movable, by motor means, between said positions in response to a signal generated when the shuffle reaches one of said terminal positions.

5. A metering device according to claim 4, further comprising
   a housing comprised of a first inlet means and second inlet means, first outlet means and second outlet means, said rotor assembly being rotatable within the housing, the rotor assembly comprising an element defining the said chamber, and also defining a first passage which extends from one end of the chamber and a second passage which extends from the other end of the chamber, the rotor assembly, in one position, having the first passage aligned with and in communication with said first inlet, and said second passage aligned with and in communication with said first outlet, and being rotatable to a second position in which said first passage is aligned with and in communication with said second outlet and said second passage is in alignment with and in communication with said second inlet the said passages being substantially sealed in other positions of the rotor.

6. A metering device according to claim 5 wherein the rotor comprises a first plurality of passages located to be aligned individually, on rotation of the rotor, with the first inlet and second outlet ad a second plurality of passages located to be aligned individually, on rotation of the rotor, with the second inlet and first outlet.

7. A metering device according to claim 6 wherein said first plurality of passages and said second plurality of passages each comprise an odd number of passages, between five and nine.

8. A metering device according to claim 5, wherein the rotor assembly comprises a body portion, said body comprising a central region with a relatively large diameter, the body tapering, from the central region of large diameter, towards opposed ends of the body, each tapering part of the body being snugly received within a co-operating frusto-conical or tapering opening formed in a respective annular element each annular element being provided with a respective said inlet and a respective said outlet.

9. A metering device according to claim 8 wherein said annular elements are retained within a housing, and means are provided to apply force to the faces of the annular elements to bias the elements inwardly into secure sealing contact with the tapering parts of the body.

10. A metering device according to claim 9 wherein the force applying means comprise means to apply hydraulic pressure to the end faces of the annular elements.

11. A metering device according to claim 4, further comprising a fixed body, the fixed body defining said chamber and defining first inlet means, second inlet means, first outlet means and second outlet means, each of said inlet means and outlet means terminating at an exterior surface of the body at a position adjacent the termination, at the exterior of the body, of a respective passage leading to a respective end of the said chamber, the rotor assembly being mounted on the exterior of the body, the rotor assembly comprising means which in one position of the rotor assembly, create a communication between the first inlet and the respective passage, and the second outlet and the respective passage and which, in an alternate position of the rotor assembly establish a connection between the second inlet and the respective passage, and the first outlet and the respective passage but which, in other positions of the rotor assembly, substantially seal said inlets and said passages.

12. A metering device according to claim 1, wherein said valve means comprise individual valves associated with said inlet means and outlet means.

13. A metering device according to claim 1, wherein one end of the chamber is connected to a valve, the valve being adapted to connect said one end of the chamber selectively to either a source of fluid to be introduced to the chamber, or to an exit conduit, the other end of the chamber being connected to a second corresponding valve adapted to connect the said other end of tile chamber selectively to either an exit conduit or a source of fluid to be introduced to the chamber.

14. A metering device according to claim 1, wherein each end of the chamber is associated with a respective entry conduit and exit conduit, each conduit having a respective valve to control flow in the conduit.

15. A device according to claim 1, further comprising a sensor is provided to sense fluid leaking from the device and to generate a signal indicative of the fluid leakage detected.

16. A device according to claim 1, further comprising stop valve means in a flow path for fluid leaving the chamber, the stop valve means being adapted to be opened only when the valve means permit flow from the chamber to the flow path.

17. A metering device arrangement comprising two metering devices according to claim 1, each metering device being associated with a reservoir of liquid to be metered by the metering device, the outlets of the metering devices being directed to a mixer adapted to mix liquids from the reservoirs when metered by the devices, the control means of the metering devices each providing signals to a supervising control arrangement, the supervising control arrangement being adapted to stop the operation of one metering device in response to a ceasing of the operation of the other metering device.

18. An arrangement according to claim 17 wherein the control means of each metering device pass a signal to the supervising control means on receipt of a signal generated when a shuttle of the respective metering device reaches a respective terminal position, the supervising control means comprising counters adapted to count the signals, and means to compare the counts present in the counters, the supervising control further comprising means adapted to stop operation of the metering devices if an output from a comparator exceeds predetermined threshold.

19. An arrangement according to claim 18 further comprising means to re-set the counters when the count in a counter exceeds a predetermined threshold.

\* \* \* \* \*